(12) United States Patent
Park et al.

(10) Patent No.: US 9,158,022 B2
(45) Date of Patent: Oct. 13, 2015

(54) ELECTRICAL PROBING ELECTRODE

(75) Inventors: In-Hwa Park, Daejeon (KR);
Seong-Kon Lee, Daejeon (KR);
Kwon-Gyu Park, Daejeon (KR)

(73) Assignee: KOREA INSTITUTE OF GEOSCIENCE & MINERAL, Daejeon (KR)

( * ) Notice: Subject to any disclaimer, the term of this patent is extended or adjusted under 35 U.S.C. 154(b) by 109 days.

(21) Appl. No.: 13/806,976

(22) PCT Filed: Feb. 13, 2012

(86) PCT No.: PCT/KR2012/001070
§ 371 (c)(1),
(2), (4) Date: Dec. 26, 2012

(87) PCT Pub. No.: WO2012/111948
PCT Pub. Date: Aug. 23, 2012

(65) Prior Publication Data
US 2013/0169280 A1 Jul. 4, 2013

(30) Foreign Application Priority Data
Feb. 15, 2011 (KR) .......................... 10-2011-0013296

(51) Int. Cl.
*G01V 3/00* (2006.01)
*G01V 3/04* (2006.01)

(52) U.S. Cl.
CPC ... *G01V 3/00* (2013.01); *G01V 3/04* (2013.01)

(58) Field of Classification Search
CPC .................................... G01V 3/00; G01V 3/04
USPC ........................................................ 324/347
See application file for complete search history.

(56) References Cited

U.S. PATENT DOCUMENTS

| 1,864,688 | A | * | 6/1932 | Frank | 439/100 |
|---|---|---|---|---|---|
| 2,189,377 | A | * | 2/1940 | Heiland | 324/358 |
| 2,225,445 | A | * | 12/1940 | Green | 313/260 |
| 2,899,589 | A | * | 8/1959 | Reichert | 313/243 |
| 3,735,249 | A | * | 5/1973 | Stoll | 324/348 |
| 4,342,115 | A | * | 7/1982 | Davis | 372/87 |
| 7,617,584 | B1 | * | 11/2009 | Moore | 29/505 |
| 2008/0136421 | A1 | * | 6/2008 | Bryant et al. | 324/357 |
| 2011/0121845 | A1 | * | 5/2011 | Laepple et al. | 324/693 |

FOREIGN PATENT DOCUMENTS

KR          10-0870061          11/2008

* cited by examiner

*Primary Examiner* — Thomas F Valone
(74) *Attorney, Agent, or Firm* — Christensen Fonder P.A.

(57) ABSTRACT

An electrode for electric survey includes a first electrode rod having a tip portion at one end thereof; and a second electrode rod connected to a side surface of the first electrode rod. The second electrode rod is formed at one end thereof with a removing/hook portion perpendicularly connected to the side surface of the first electrode rod, and at the other end thereof with a wire connecting portion for connection with an electric wire, and has a bent portion between the removing/hook portion and the wire connecting portion. The electrode allows convenient connection of electric wires, ensures good contact with the electric wires so as to prevent easy separation of electric wires therefrom, can reduce a time for installation and removal of the electrode and measurement error, and does not necessitate use of electrical tape in installation of the electrode to thereby reduce environmental contamination due to waste tape.

16 Claims, 4 Drawing Sheets

(a)

(b)

ELECTRICAL PROBING ELECTRODE

PRIORITY CLAIM

The present application is a National Phase entry of PCT Application No. PCT/KR2012/001070, filed Feb. 13, 2012, which claims priority from Korean Application No. 10-2011-0013296, filed Feb. 15, 2011, the disclosures of which are hereby incorporated by reference herein in their entirety.

FIELD OF THE INVENTION

The present invention relates to an electrode for electric survey, and more particularly, to an electrode for electric survey which allows convenient connection of electric wires, ensures good contact with the electric wires so as to prevent easy separation of electric wires therefrom, can reduce a time for installation and removal of the electrode and measurement error, and does not necessitate use of electrical tape in installation of the electrode to thereby reduce environmental contamination due to waste tape.

BACKGROUND

Electric resistivity survey is a survey method that is prompt and effective in identifying a fault, a fracture zone, a rock border, and the like.

Electrode arrays mainly used in electric resistivity survey most widely used in groundwater exploration include a pole-pole array, a pole-dipole array, and a dipole-dipole array. However, a modified pole-pole array and a dipole-dipole array, in which a negative potential electrode and a current electrode are secured to opposite ends of a survey line due to difficulty in connection to ground according to field conditions, are currently most commonly employed.

FIG. 1a is a conceptual diagram of arrangement of electrodes in a dipole-dipole array, and FIG. 2b is a conceptual diagram of arrangement of electrodes in a modified pole-pole array.

In order to survey underground water and identify a geological structure, a fault and a fracture zone of a subsurface of less than 50 m under the ground, a high-resolution electric resistivity survey is performed with electrodes separated a distance of 5 m, 10 m or less from each other. To this end, more than 100 potential and current electrodes are disposed along a survey line. In this case, to connect an electric wire to an electrode, a banana jack is connected to the electric wire and is inserted into the electrode having a hole, or an electric wire is connected by an electrical tape as shown in FIG. 2.

However, since the method of connecting a banana jack to an electric wire consumes considerable time and cost and contact errors frequently occur in proportion to the number of times of use, measurement data can have an error and considerable time is consumed to correct the error.

Further, when an electric wire is provided to an electrode using electrical tape as shown in FIG. 2, a large amount of the electrical tape is necessary and considerable time is required to install and withdraw the electrode.

In addition, if the electric wire is erroneously pulled or touched in the course of connecting the electric wire to the electrode using the electrical tape, the electric wire can be separated from the electrode, thereby causing an error in measurement data. In particular, in rainy weather or in a season when it is humid in the morning and in the evening, a contact error can occur due to moisture and the electrical tape can be frozen in winter, thereby causing frequent separation of the electrode.

Further, when the electrode is withdrawn after the survey, the electrical tape needs to be manually released and considerable time is required to separate the electrode from the wire. Moreover, the separated electrical tape cannot be reused and is generally discarded on the ground, causing environmental contamination.

SUMMARY

The present invention is conceived to solve the above problems, and an aspect of the present invention is to provide an electrode for electric survey which allows convenient connection of electric wires, ensures good contact with the electric wires so as to prevent easy separation of electric wires therefrom, can reduce a time for installation and removal of the electrode and measurement error, and does not necessitate use of electrical tape in installation of the electrode to thereby reduce environmental contamination due to waste tape.

In accordance with an aspect of the present invention, an electrode for electric survey includes: a first electrode rod having a tip portion at one end thereof, wherein the first electrode rod is provided with a connecting spring having a resilient plate shape. Here, the connecting spring has a free end corresponding to one end of the connecting spring and connected to an electric wire, and a fixed end corresponding to the other end thereof and detachably attached to the first electrode rod.

Preferably, the first electrode rod is further provided with a fixing spring surrounding the fixed end of the connecting spring and the first electrode rod to secure the connecting spring in place.

More preferably, the first electrode rod has a fixing groove formed along an outer peripheral surface thereof at an installation location of the fixing spring to accommodate the fixing spring therein.

More preferably, the first electrode rod is formed at the other end thereof with a head portion.

More preferably, the electrode further includes a second electrode rod connected to a side surface of the first electrode rod.

In accordance with another aspect of the present invention, an electrode for electric survey includes: a first electrode rod having a tip portion at one end thereof; and a second electrode rod connected to a side surface of the first electrode rod, wherein the second electrode rod is formed at one end thereof with a removing/hook portion perpendicularly connected to the side surface of the first electrode rod, and at the other end thereof with a wire connecting portion for connection with an electric wire, and has a bent portion between the removing/hook portion and the wire connecting portion.

Preferably, the first electrode rod is formed at the other end thereof with a head portion.

More preferably, the bent portion is bent at a right angle such that the wire connecting portion is parallel to the first electrode rod.

More preferably, the wire connecting portion is provided with a connecting spring having a resilient plate shape. The connecting spring has a free end corresponding to one end of the connecting spring and connected to an electric wire, and a fixed end corresponding to the other end of the connecting spring and detachably attached to the wire connecting portion.

More preferably, the wire connecting portion is further provided with a fixing spring surrounding the fixed end of the connecting spring and the wire connecting portion to secure the connecting spring in place.

More preferably, the wire connecting portion has a fixing groove formed along an outer peripheral surface thereof at an installation location of the fixing spring to accommodate the fixing spring therein.

In accordance with a further aspect of the present invention, an electrode for electric survey includes: a first electrode rod having a tip portion at one end thereof; and a second electrode rod connected to a side surface of the first electrode rod, wherein the second electrode rod is bent such that the second electrode rod is perpendicularly connected at one end thereof to the side surface of the first electrode rod and has the other end parallel to the first electrode rod.

Preferably, the first electrode rod is provided at the other end thereof with a head portion.

The electrode for electric survey according to the present invention allows convenient connection of electric wires, ensures good contact with the electric wires so as to prevent easy separation of electric wires therefrom, can reduce a time for installation and removal of the electrode and measurement error, and does not necessitate use of electrical tape in installation of the electrode to thereby reduce environmental contamination due to waste tape.

DETAILED DESCRIPTION

Now, an exemplary embodiment of the present invention will be described in detail with reference to the accompanying drawings.

Figure 1:
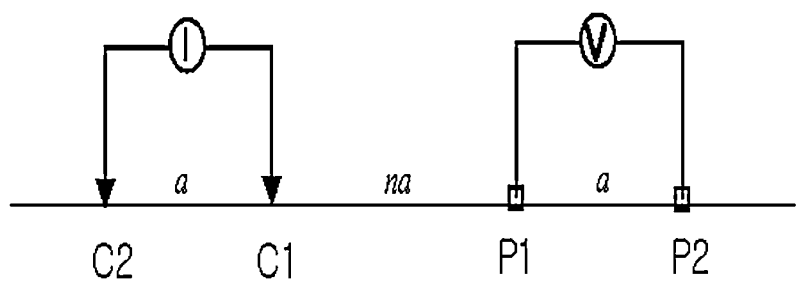
FIG. 1 is a view explaining an electric survey method to which the present invention is applied.
Figure 1:
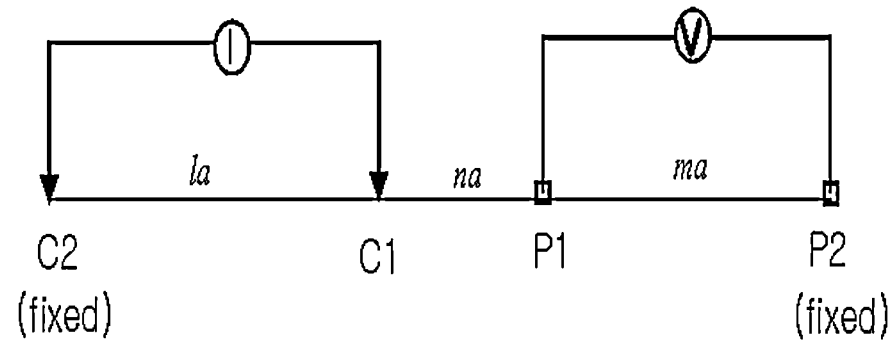
Figure 2:
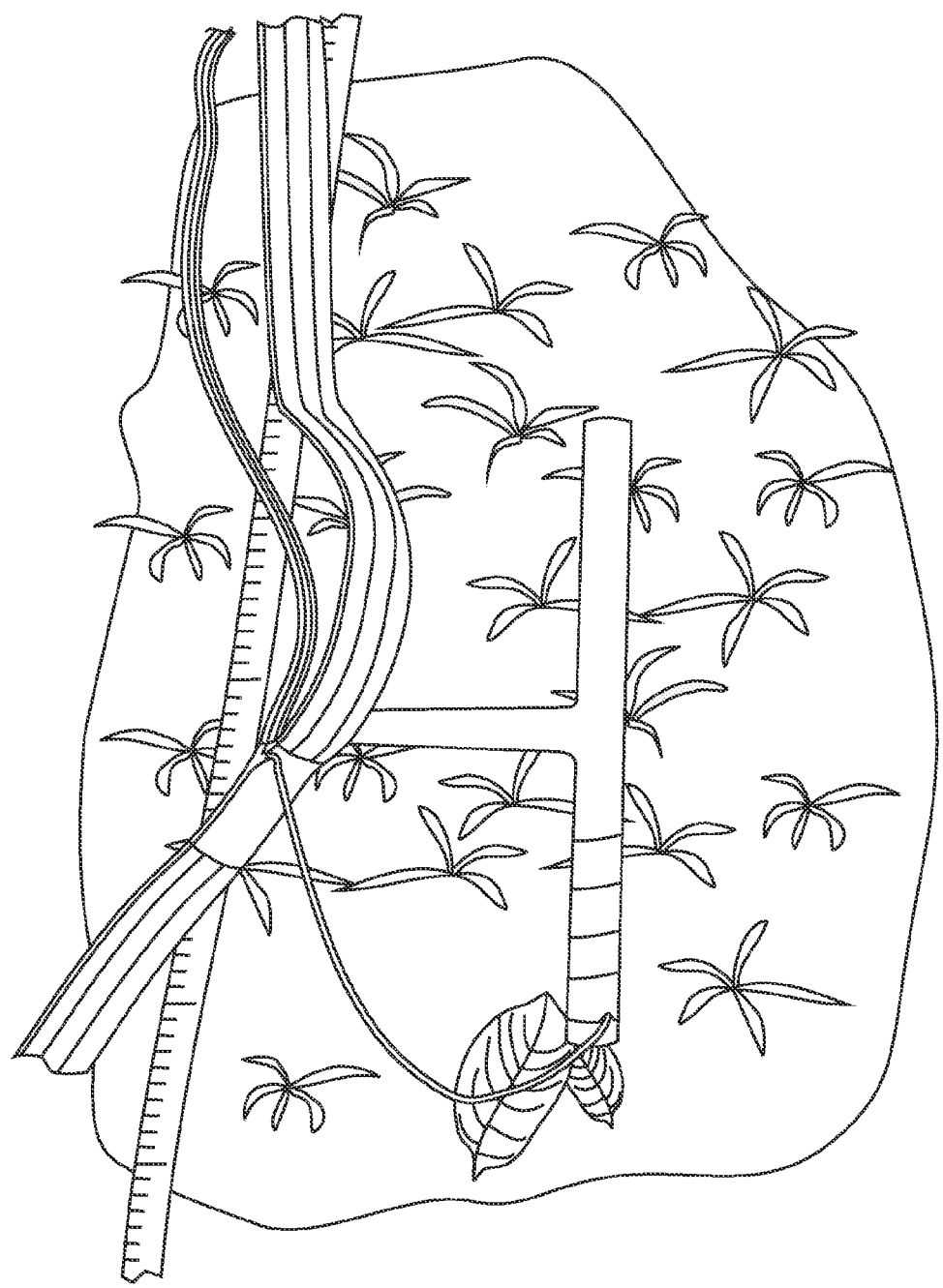
FIG. 2 is a picture of a conventional electrode.
Figure 3:
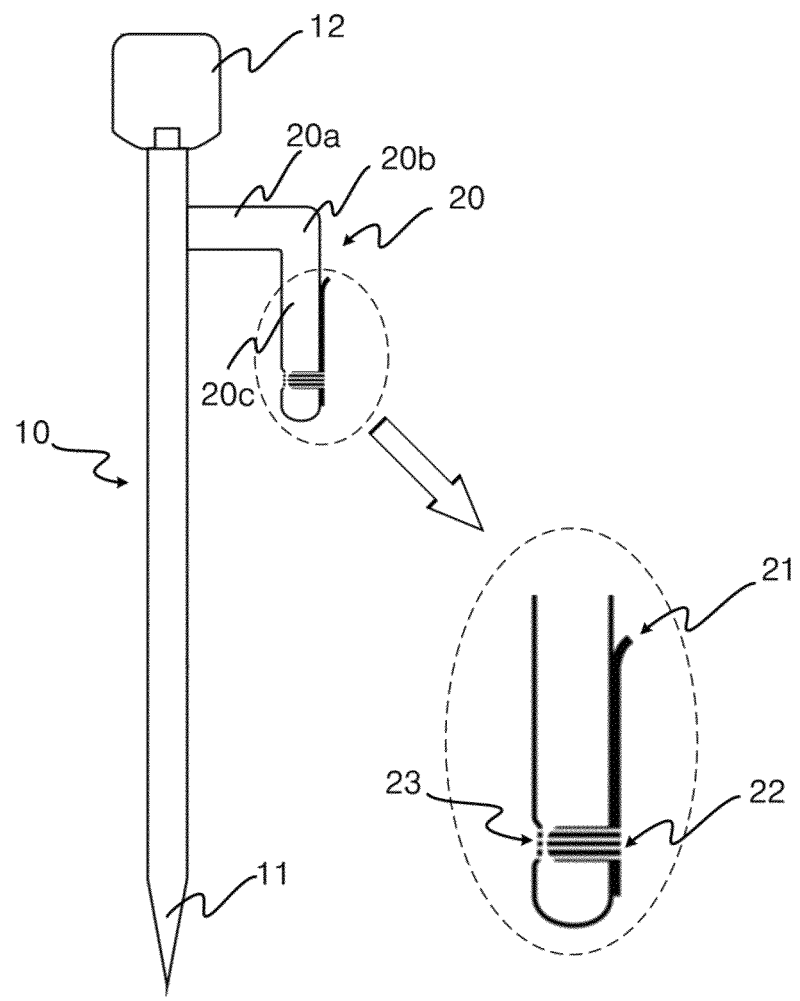
FIG. 3 is a side view of an electrode for electric survey according to one embodiment of the present invention.
Figure 4:
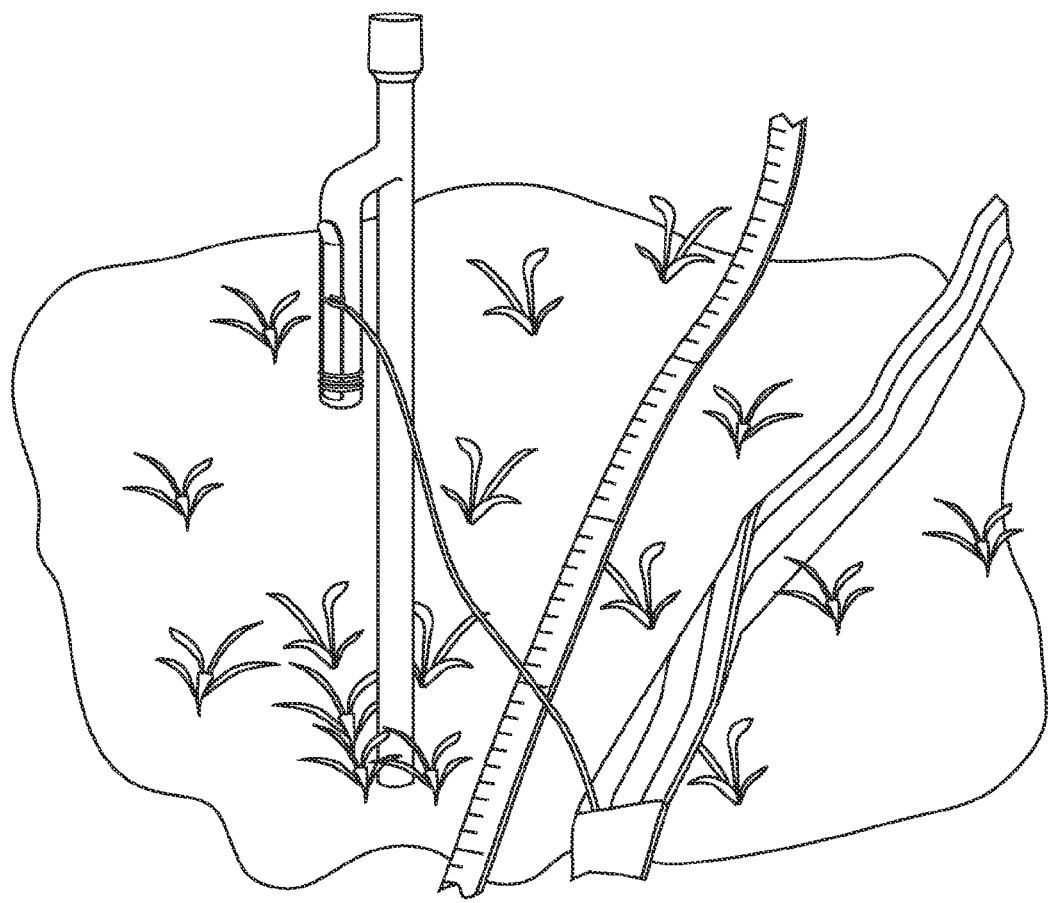
FIG. 4 is a picture of the electrode for electric survey in an installed state according to the embodiment of the present invention.

FIG. 3 is a side view of an electrode for electric survey according to one embodiment of the present invention and FIG. 4 is a picture of the electrode for electric survey in an installed state according to the embodiment of the present invention.

Referring to FIGS. 3 and 4, an electrode for electric survey according to one embodiment of the present invention includes a first electrode rod 10 generally extending in a straight line, and a second electrode rod 20 extending from a side surface of the first electrode rod 10.

The first electrode rod 10 is driven at one region thereof into the ground and is connected to an electric wire upon electric survey. The first electrode rod 10 has a predetermined diameter and is made of stainless steel having excellent electrical conductivity. For example, the first electrode rod 10 may have a length of 400 mm to 500 mm and a diameter of 7 mm to 12 mm.

The first electrode rod 10 is formed at one end thereof with a head portion 12, which has a larger diameter than that of the first electrode rod 10, and is formed at the other end thereof with a tip portion 11 to facilitate driving of the first electrode rod 10 into the ground.

The head portion 12 corresponds to a portion of the first electrode rod 10 which will be struck by a hammer and has a larger diameter than that of the first electrode rod 10 such that the first electrode rod 10 can be successfully struck by the hammer. The head portion 12 has a rounded corner.

The first electrode rod 10 may have a circular cross-section, but the present invention is not limited thereto. That is, the first electrode rod 10 may have any cross-sectional shape including a polygonal cross-section, such as a triangular cross-section, a rectangular cross-section, or the like.

Meanwhile, the second electrode rod 20 is bent to have a substantially L-shape and is connected to the side surface of the first electrode rod 10 such that an electric wire can be easily connected or removed therefrom. The second electrode rod 20 may have a predetermined diameter and may be made of stainless steel having excellent electrical conductivity.

The second electrode rod 20 is formed at one end thereof with a removing/hook portion 20a perpendicularly connected to the side surface of the first electrode rod 10, and at the other end thereof with a wire connecting portion 20c for connection to an electric wire. Further, the second electrode rod 20 includes a bent portion 20b formed at a predetermined angle between the removing/separating portion 20a and the wire connecting portion 20c, such that the wire connecting portion 20c extends transversely, or in an embodiment, perpendicularly, from removing/hook portion 20a.

The bent portion 20b may be bent at a right angle. As a result, the removing/hook portion 20a is perpendicular to the first electrode rod 10 and the wire connecting portion 20c is parallel to the first electrode rod 10.

In this embodiment, the wire connecting portion 20c is configured to face the tip portion 11 due to the bent portion 20b as shown in FIG. 3, but the wire connecting portion 20c may be configured to face the head portion 12.

In another embodiment, the wire connecting portion 20c may be disposed so as not to be parallel to the first electrode rod 10. In this case, the wire connecting portion 20c may be disposed perpendicular to the first electrode rod 10, or may be slanted at various angles according to field situations or experiment situations.

The removing/hook portion 20a of the second electrode rod 20 corresponds to a grip used upon installation or removal of the electrode, and in particular, may be used upon removal of the electrode. Actually, it is not easy to remove the electrode rod from the ground after an experiment for several hours or several days. In particular, the ground state can vary according to seasonal influence, weather, temperature, and the like, and thus, it can become difficult to remove the electrode rod from the ground by gripping the electrode rod in the hand, causing considerable time consumption in withdrawal of survey equipment.

According to the present invention, since the removing/hook portion 20a of the second electrode rod 20 is perpendicular to the first electrode rod 10 directly inserted into the ground, the second electrode rod 20 may be easily removed from the ground by hooking a removing/hook portion 20a of another electrode rod with the removing/hook portion 20a of the electrode rod to be removed and then pulling the removing/hook portion 20a upwards using the other electrode rod which is in an upside-down state. In particular, since these two electrode rods have a long length, the electrode rod can be easily removed from the ground by an operator without bending the waist.

The wire connecting portion 20c of the second electrode rod 20 may be provided with a connecting spring 21 and a fixing spring 22.

The connecting spring 21 corresponds to a part to which an electric wire is directly connected, and is formed by heat-treating a resilient spring having a plate shape. The connecting spring 21 has one end facing the bent portion 20b and corresponding to a free end, and the other end corresponding to a fixed end. An electric wire is connected to the free end of the connecting spring 21, and preferably, an electric wire having a ring-shaped distal end is fitted to the free end of the connecting spring. The fixed end of the connecting spring 21 is securely inserted into a groove of the wire connecting portion 20c.

Thus, it can be conveniently performed to connect the electric wire to the electrode by temporarily separating the free end of the resilient connecting spring 21 from the wire connecting portion 20c, and, after the electric wire is connected to the electrode, the wire and the electrode can contact each other and maintain contact due to resilient restoring force which presses the free end of the connecting spring 21 towards the wire connecting portion 20c.

Further, since the fixed end of the connecting spring 21 may be detachably attached to the groove so as to permit replacement of the connecting spring 21, only operation of replacing the connecting spring 21 needs to be performed even when resilient force of the connecting spring 21 is lowered after long-term use thereof Meanwhile, the fixed spring 22 is a coil spring surrounding the fixed end of the connecting spring 21 and prevents the connecting spring 21 from being separated from the electrode. Here, a fixing groove 23 is formed along an outer peripheral surface of the wire connecting portion 20c at an installation location of the fixing spring 22 such that the fixing spring 22 can be placed and maintained in the fixing groove 23. The fixing groove 23 accommodates the fixing spring 22 to secure the fixing spring 22 in place, thereby preventing upward and downward movement of the fixing spring 22. Consequently, this structure guides a fixing operation of the connecting spring 21.

Meanwhile, the connecting spring 21 and the fixing spring 22 may be directly provided to the first electrode rod 10 to connect an electric wire to the first electrode rod 10. In this case, the connecting spring 21 and the fixing spring 22 may be disposed at any position of the first electrode rod 10 other than a portion of the first electrode rod 10 buried under the ground. Here, although the electrode for electric survey may be configured without the second electrode rod 20, the electrode may further include the second electrode rod 20 for convenience in removal of the electrode. Of course, when the connecting spring 21 and the fixing spring 22 are directly provided to the first electrode rod 10, the fixing groove 23 is formed along the outer peripheral surface of the first electrode rod 10 at the installation location of the fixing spring 22 in order to place and maintain the fixing spring 22 on the fixing groove 23.

Although some embodiments have been described with reference to the accompanying drawings, it should be appreciated that the foregoing embodiments are provided for illustrative purposes only and are not to be in any way construed as limiting the present invention. It will be understood by those skilled in the art that various modifications, changes, alterations, and equivalent embodiments can be made without departing from the spirit and scope of the invention. Therefore, the scope of the present invention should be limited only by the accompanying claims and equivalents thereof

The invention claimed is:

1. An electrode for electric survey, comprising:
    a first electrode rod comprising a linear rod that includes a head portion at a first end, a tip portion at a second end, and a body portion between the first end and the second end, and
    a second electrode rod in electrical connection with the first electrode rod and coupled to the body portion of the first electrode rod, the second electrode rod including a first portion extending from the body portion of the first electrode rod, and a second portion defining a first end and a second end, the second portion connected to the first portion at the first end such that the second portion extends essentially transversely from the first portion so as to be essentially parallel to the first electrode rod;
    wherein the second portion of the second electrode rod is provided with a resilient connecting spring defining a fixed end and a free end opposite the fixed end, the fixed end of the connecting spring detachably secured and connected to the second portion thereby causing the free end to be pressed toward, the second portion such that an electrical wire received between the free end and the second portion is pressed against, and in contact with, the second portion causing the electrical wire to be detachably in electrical connection with the second portion.

2. The electrode of claim 1, wherein the second electrode rod is further provided with a fixing spring surrounding the fixed end of the connecting spring and the second portion of the second electrode rod to secure the connecting spring in place.

3. The electrode of claim 2, wherein the second portion of the second electrode rod has a fixing groove formed on an outer peripheral surface thereof at an installation location of the fixing spring to accommodate the fixing spring therein.

4. The electrode of claim 1, wherein the first end of the second electrode rod extends essentially perpendicularly from a body portion of the first electrode rod and the second end extends essentially perpendicularly from the first end of the second electrode rod such that the second end of the second electrode rod is essentially parallel to the body portion of the first electrode rod.

5. The electrode of claim 1, wherein the connecting spring comprises a portion extending from the fixed end to the free end.

6. An electrode for electric survey, comprising:
    a first electrode rod having a tip portion at a first end thereof; and
    a second electrode rod connected to a side surface of the first electrode rod, the second electrode rod including a removing portion perpendicularly connected at a first end to the side surface of the first electrode rod, a wire connecting portion at a second end, the wire connecting portion for connection with an electric wire, and a bent portion between the removing portion and the wire connecting portion such that the wire connecting portion is essentially parallel to the first electrode rod;
    a connecting spring connected to the wire connecting portion;
    wherein the connecting spring defines a fixed end and a free end opposite the fixed end, the connecting spring secured and connected to the wire connecting portion at the fixed end, thereby causing the connecting spring to be in contact with a surface of the wire connecting portion of the second electrode rod from the fixed end to the free end, the free end being pressed toward the surface of the wire connecting portion of the second electrode rod such that an electrical wire received between the free end and the surface of the second electrode rod is pressed against the surface of the wire connecting portion of the second electrode rod thereby causing the electrical wire to be detachably in electrical connection with the surface of the wire connecting portion of the second electrode rod.

7. The electrode of claim 6, wherein the first electrode rod includes a head portion formed at a second end thereof.

8. The electrode of claim 6, wherein the bent portion is bent at a right angle such that the wire connecting portion is parallel to the first electrode rod.

9. The electrode of claim 6, wherein the connecting spring comprises a portion extending between the fixed end and the free end.

10. The electrode of claim 9, further comprising a fixing spring surrounding the fixed end of the connecting spring and a portion of the wire connection portion of the second electrode rod to secure the connecting spring in place.

11. The electrode of claim 10, wherein the second end of the second electrode rod has a fixing groove formed along an outer peripheral surface thereof at an installation location of the fixing spring to accommodate the fixing spring therein.

12. An electrode for electric survey, comprising:
- a first electrode rod having a tip portion at a first end thereof; and
- a second electrode rod connected to a side surface of the first electrode rod at a first end, wherein the second electrode rod is bent such that the second electrode rod is essentially perpendicularly connected at one end thereof to the side surface of the first electrode rod and such that a second end is essentially parallel to the first electrode rod; and
- a connecting spring defining a fixed end and a free end opposite the fixed end, the connecting spring secured and connected to the second electrode rod at the fixed end, thereby causing the connecting spring to be in contact with a surface of the second electrode rod, the free end being pressed toward the surface of the second electrode rod.

13. The electrode of claim 12, wherein the first electrode rod includes a head portion at a second end thereof.

14. The electrode of claim 12, wherein the second electrode rod is further provided with a fixing spring surrounding the fixed end of the connecting spring and the second portion of the second electrode rod to secure the connecting spring in place.

15. The electrode of claim 14, wherein the second end of the second electrode rod has a fixing groove formed on an outer peripheral surface thereof at an installation location of the fixing spring to accommodate the fixing spring therein.

16. The electrode of claim 12, wherein the first electrode rod includes a head portion formed at a second end thereof.

* * * * *